United States Patent [19]

Le Grow et al.

[11] 3,919,276

[45] Nov. 11, 1975

[54] METHOD OF PREPARING AMINES AND AMIDES

[75] Inventors: Gary E. Le Grow; John L. Speier, both of Midland, Mich.

[73] Assignee: Dow Corning Corporation, Midland, Mich.

[22] Filed: July 31, 1974

[21] Appl. No.: 493,423

[52] U.S. Cl.................. 260/448.2 E; 260/448.8 R; 260/561 R; 260/562 R; 260/578; 260/583 R
[51] Int. Cl.²..... C07F 7/08; C07F 7/10; C07F 7/18
[58] Field of Search .. 260/448.2 E, 448.8 R, 561 R, 260/562 R, 578, 583 R

[56] References Cited
UNITED STATES PATENTS

| | | | |
|---|---|---|---|
| 2,971,970 | 2/1961 | Bluestein | 260/448.2 E |
| 3,776,933 | 12/1973 | Toporcer et al. | 260/448.2 E |

*Primary Examiner*—Paul F. Shaver
*Attorney, Agent, or Firm*—Robert F. Fleming, Jr.

[57] ABSTRACT

Amines and amides are prepared by reacting certain aliphatic, cycloaliphatic and aromatic chlorides with N,N-substituted triorganosilyl amines or N-substituted triorganosilyl amides. A typical reaction is

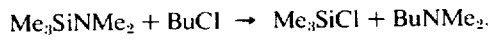

$Me_3SiNMe_2 + BuCl \rightarrow Me_3SiCl + BuNMe_2.$

3 Claims, No Drawings

METHOD OF PREPARING AMINES AND AMIDES

It is known that N,N-substituted silyl amines will react with activated halogen compounds to form amines and silicon halides. Heretofore, however, this reaction has been suggested with only the activated halogens such as acyl halides, chloro carbonates, alkyl iodides, alpha-bromo ethers, benzyl chloride, carbon tetrachloride, cyano-substituted halobenzenes and isocyanide dichlorides. As is well known, such halogens are far more reactive than the chlorine in, say, alkyl or aryl chlorides and it is, therefore, surprising that this reaction will also go with the latter.

It is the object of this invention to provide a novel method for the preparation of tertiary amines and of N-substituted amides.

This invention relates to a method comprising reacting a compound of the formula $R_3SiNR'_2$ or $R_3SiNHO\!=\!CR'$ with a chloride of the formula $R''Cl$ at a temperature and pressure whereby compounds of the formula $R''NR'_2$ and $R''NHO\!=\!CR'$ respectively are obtained in which R and R' are alkyl groups and R'' is a hydrocarbon radical having no carbon-carbon aliphatic* unsaturation beta to the chlorine or a silyl radical of the formula $X_3SiQ-$ in which X is alkyl, chlorine or alkoxy and Q is a divalent hydrocarbon radical having no carbon-carbon aliphatic unsaturation beta to the chlorine and in which Q is of such size that the chlorine is at least three carbon atoms removed from the silicon.

*Includes both linear and cyclo aliphatic carbon-carbon unsaturation.

The advantages of the process of this invention are that no side reactions occur giving rise to such compounds as quaternary ammonium compounds, the by-produced triorganosilyl chloride is easily removed from the reaction mixture and finally, no salt is formed during this reaction. The latter is of particular importance in this day of ecological problems since the disposal of amine hydrochlorides can be quite serious.

The reaction of this invention is best carried out by heating a mixture of the ingredients at a temperature of from 100° to 250°C. but below the decomposition of the product. With low boiling reactants and products it is best to carry out the reaction under autogenous pressure.

If desired, the reaction can be speeded up by using Lewis acid catalysts such as aluminum chloride, ferric chloride or boron trifluoride. In general, 1 percent by weight of the catalyst based on the reactants is sufficient although more or less catalysts can be used if desired.

For the purpose of this invention, R and R' can each be any alkyl radical such as methyl, ethyl, isopropyl, octyl or dodecyl. X can be any alkyl radical such as those shown for R or R' above and in addition, any alkoxy group such as methoxy, ethoxy, isopropoxy, butoxy or octadecyloxy.

R'' can be any hydrocarbon radical in which there is no carbon-carbon aliphatic unsaturation beta to the chlorine atom. Thus, R'' can be any alkyl radical such as methyl, ethyl, isopropyl, octyl or octadecyl; alkenyl radicals such as 3-butenyl, 3-octenyl, 7-octadecenyl, 1-methyloctenyl-5, or 2-butyl-4-nonenyl; any cycloaliphatic hydrocarbon radical such as cyclohexyl, cyclopentyl, methylcyclohexyl, butylcyclohexyl, or 3-cyclohexene-1-yl; any aromatic hydrocarbon radical such as phenyl, xenyl, naphthyl, anthracyl, tolyl, or xylyl and any aralkyl radical such as beta-phenylethyl, beta-naphthylethyl or omega-phenyloctyl.

Q can be any divalent hydrocarbon radical having no carbon-carbon aliphatic unsaturation beta to the chlorine and being of such size that there is at least three carbon atoms between the silicon and the chlorine. Thus, Q can be alkylene radicals such as trimethylene, tetramethylene, pentamethylene, or octadecamethylene or any arylene radical such as phenylene, naphthylene, anthracylene, or any cycloaliphatic hydrocarbon radical such as cyclohexylene or methylcyclohexylene.

The following examples are illustrative only and should not be construed as limiting the invention which is preperly delineated in the appended claims.

EXAMPLE 1

An equimolar mixture of dimethylaminotrimethylsilane and n-butyl chloride was placed in a sealed vessel. The vessel was heated at 165°C. and the rate of the reaction was followed by periodically taking samples and analyzing them by gas liquid chromotography. Under these conditions, the reaction was 85 to 90 percent complete in 20.5 hours to give the product butyldimethylamine.

The reaction was repeated except that 1 percent by weight aluminum chloride based on the weight of the reactants was added. The reaction was from 85 to 90 percent complete in 8 hours to produce butyldimethylamine. The materials reacted at a constant rate of about 0.17 moles per liter per hour without aluminum chloride and about 0.4 moles per liter per hour with 1 percent aluminum chloride.

EXAMPLE 2

An equimolar mixture of dimethylaminotrimethylsilane and n-pentyl chloride containing 1 percent by weight aluminum chloride was heated in a sealed vessel at 140 to 160°C. for 18 hours. At the end of this time gas liquid chromotography indicated a quantitative yield of pentyl dimethyl amine.

EXAMPLE 3

The following chlorides were reacted with dimethylaminotrimethylsilane in equimolar mixture in the presence of 1 percent by weight of aluminum chloride in a sealed container at 140° to 160°C. for 18 hours. The reaction proceeded in accordance with the equation $$R''Cl + Me_3SiNMe_2 \rightarrow Me_3SiCl + Me_2NR''$$

in which R'' is as shown in the table below:

| Structure of R'' | Percent Yield of Me₂NR'' |
|---|---|
| phenyl | 99% |
| 1,1-dimethylpropyl | 98% |
| 2,2-dimethylpropyl | 92% |
| 1-methylbutyl | 99% |
| beta-phenylethyl | 99% |
| gamma-(trimethoxysilyl)-propyl | 92% |
| gamma-(trichlorosilyl)-propyl | 98% |
| para-(trichlorosilyl)-phenyl | 93% |

EXAMPLE 4

The technique of Example 2 was repeated with a series of organic chlorides and N-trimethylsilyl acetamide with 1 percent aluminum chloride. The reaction proceeded according to the equation R''Cl + CH₃C=ONHSiMe₃ → Me₃SiCl + CH₃C=ONHR'' in which R'' is as shown in the table below:

| Structure of R'' | Yield of CH₃C=ONHR'' |
|---|---|
| phenyl | 94% |
| gamma-(trichlorosilyl)-propyl | 96% |
| para-(trichlorosilyl)-phenyl | 95% |
| gamma-(trimethoxysilyl)-propyl | 99% |
| 2,2-dimethylpropyl | 99% |

EXAMPLE 5

When the following silyl amines and silyl amides are reacted with methyl chloride in accordance with the procedure of Example 1, the following amines and amides are formed:

| Silyl Amine | Amine |
|---|---|
| isopropyldimethylsilyl-dibutylamine | methyldibutyl-amine |
| octadecyldimethylsilyl-dimethylamine | dimethylamine |
| trimethylsilylocta-decylmethylamine | octadecyldi-methylamine |

| Silyl Amide | Amide |
|---|---|
| N-isopropyldimethylsilyl acetamide | N-methyl acetamide |
| N-trimethylsilyl valeramide | N-methyl valeramide |
| N-octadecyldimethylsilyl acetamide | N-methyl acetamide |
| N-trimethylsilyl stearamide | N-methyl stearamide |

EXAMPLE 6

When trimethylsilyldimethylamine is reacted with the following chlorides in accordance with the procedure of Example 1, the following products are obtained.

| Chloride | Product |
|---|---|
| 3-octenyl chloride | 3-octenyl dimethyl amine |
| octadecyl chloride | octadecyldimethyl amine |
| m-tolyl chloride | m-tolyldimethyl amine |
| anthracyl chloride | anthracyldimethyl amine |
| cyclohexyl chloride | cyclohexyldimethyl amine |
| Me₃SiCH=CH(CH₂)₁₆Cl | Me₃SiCH=CH(CH₂)₁₆NMe₂ |
| C₁₈H₃₇Me₂SiCH₂CH₂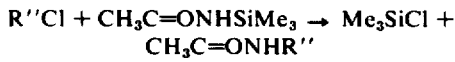Cl | C₁₈H₃₇Me₂SiCH₂CH₂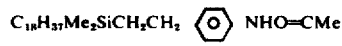NMe₂ |
| 3-cyclohexenyl chloride | 3-cyclohexenyldimethyl amine |
| (C₄H₉O)₃Si(CH₂)₃Cl | (C₄H₉O)₃Si(CH₂)₃NMe₂ |

EXAMPLE 7

When the chlorides of Example 6 are reacted with N-trimethylsilyl acetamide in accordance with the procedure of Example 4, the following products are obtained:

N,3-octenyl acetamide
N-octadecyl acetamide
N,m-tolyl acetamide
N-anthracyl acetamide
N-cyclohexyl acetamide
Me₃SiCH=CH(CH₂)₁₆NHO=CMe

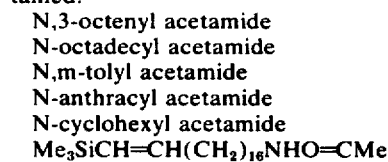

C₁₈H₃₇Me₂SiCH₂CH₂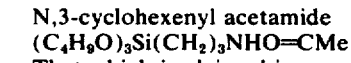NHO=CMe

N,3-cyclohexenyl acetamide
(C₄H₉O)₃Si(CH₂)₃NHO=CMe

That which is claimed is:

1. A method comprising reacting a compound of the formula (1) R₃SiNR'₂ or R₃SiNHO=CR' with a chloride of the formula (2) R''Cl at a temperature and pressure whereby compounds of the formula R''NR'₂ and R''NHO=CR' respectively are obtained in which R and R' are alkyl groups and R'' is a hydrocarbon radical having no aliphatic carbon-carbon unsaturation beta to the chlorine or a silyl substituted hydrocarbon radical of the formula X₃SiQ— in which
   X is alkyl, chlorine or alkoxy and
   Q is a divalent hydrocarbon radical having no carbon-carbon aliphatic unsaturation beta to the chlorine and of such size that the chlorine is at least 3 carbon atoms removed from the silicon.

2. A method in accordance with claim 1 in which (1) is a silyl dialkyl amine and R'' is X₃SiQ—.

3. A method in accordance with claim 1 in which (1) is a silyl amide and in which R'' is X₃SiQ—.

* * * * *